(12) United States Patent
Hohmann et al.

(10) Patent No.: US 10,985,579 B2
(45) Date of Patent: Apr. 20, 2021

(54) CIRCUIT ARRANGEMENT FOR PROTECTION AGAINST AN UNDUE OVERHEATING

(71) Applicant: Braun GmbH, Kronberg (DE)

(72) Inventors: Thomas Hohmann, Gelnhausen (DE); Torsten Klemm, Eschborn (DE); Lorraine Rispal, Heidesheim (DE)

(73) Assignee: Braun GMBH, Kronberg (DE)

( * ) Notice: Subject to any disclaimer, the term of this patent is extended or adjusted under 35 U.S.C. 154(b) by 353 days.

(21) Appl. No.: 15/486,436

(22) Filed: Apr. 13, 2017

(65) Prior Publication Data
US 2017/0310132 A1    Oct. 26, 2017

(30) Foreign Application Priority Data

Apr. 20, 2016  (EP) .................................... 16166188
Mar. 24, 2017  (EP) .................................... 17162800

(51) Int. Cl.
*H02J 7/00* (2006.01)
*H02H 9/02* (2006.01)
*H02H 3/08* (2006.01)
*H02H 7/18* (2006.01)

(52) U.S. Cl.
CPC .......... *H02J 7/0031* (2013.01); *H02H 3/085* (2013.01); *H02H 7/18* (2013.01); *H02H 9/026* (2013.01); *H02J 7/00* (2013.01); *H02J 7/0063* (2013.01); *H02J 7/00302* (2020.01); *H02J 7/00304* (2020.01)

(58) Field of Classification Search
CPC .......... H02H 3/085; H02H 7/18; H02H 9/026; H02J 7/0031; H02J 7/0052; H02J 7/0063; H02J 2007/0037; H02J 2007/0039
USPC ........................... 307/20; 320/134, 135, 150
See application file for complete search history.

(56) References Cited

U.S. PATENT DOCUMENTS

| 6,608,470 B1 * | 8/2003 | Oglesbee ............. H01M 2/348 320/135 |
| 7,660,096 B2 | 2/2010 | Golubovic et al. |
| 7,920,045 B2 | 4/2011 | Chandler et al. |
| 8,179,097 B2 | 5/2012 | Yun |

(Continued)

FOREIGN PATENT DOCUMENTS

| EP | 1577905 A2 | 9/2005 |
| EP | 2023460 A2 | 2/2009 |

(Continued)

OTHER PUBLICATIONS

European search report dated Sep. 27, 2016.

(Continued)

*Primary Examiner* — Toan T Vu
(74) *Attorney, Agent, or Firm* — Kevin C. Johnson (57) ABSTRACT

A circuit arrangement for protection against an undue overheating of a charging control, discharging control and/or a secondary battery is disclosed, the circuit arrangement comprising the secondary battery, the charging and/or discharging control for charging and/or discharging the secondary battery, a connector for connecting the charging and discharging control to an external power supply, at least one current limiting electronic component arranged in electrical connection to the charging and/or discharging control and optionally, a switchable load.

20 Claims, 2 Drawing Sheets

(56) References Cited

U.S. PATENT DOCUMENTS

| | | | |
|---|---|---|---|
| 8,686,826 | B2 | 4/2014 | Chandler et al. |
| 8,995,104 | B2 | 3/2015 | Li |
| 2003/0157399 | A1 | 8/2003 | Ikeuchi et al. |
| 2005/0200445 | A1* | 9/2005 | Hwang .................. H01C 7/021 338/22 R |
| 2006/0078844 | A1 | 4/2006 | Goldman et al. |
| 2007/0025044 | A1* | 2/2007 | Golubovic ............. H02H 9/042 361/124 |
| 2007/0090809 | A1 | 4/2007 | Miyasaka |
| 2007/0164709 | A1* | 7/2007 | Tsubaki ................ H02J 7/0031 320/134 |
| 2009/0039832 | A1 | 2/2009 | Cobianu et al. |
| 2011/0304303 | A1* | 12/2011 | Chen ..................... H02J 7/0091 320/150 |
| 2013/0154371 | A1* | 6/2013 | Ju ......................... H02J 7/1461 307/31 |
| 2013/0250465 | A1* | 9/2013 | Li .......................... H02H 9/026 361/93.8 |
| 2014/0203654 | A1* | 7/2014 | Takahashi ................ H02J 1/00 307/82 |
| 2015/0357839 | A1* | 12/2015 | Cai ....................... A24F 47/008 131/329 |
| 2016/0298589 | A1* | 10/2016 | Setterberg ............ H02J 7/1446 |
| 2017/0179713 | A1* | 6/2017 | Bourns ............... H01M 2/1016 |

FOREIGN PATENT DOCUMENTS

| | | |
|---|---|---|
| GB | 2349284 A | 10/2000 |
| JP | H10304560 A | 11/1998 |
| JP | 2001520858 A | 10/2001 |
| JP | 2008515489 A | 5/2008 |
| JP | 2009142140 A | 6/2009 |
| JP | 2013118740 A | 6/2013 |
| WO | 2004079852 A1 | 9/2004 |

OTHER PUBLICATIONS

Braccini, Roberto; European Search Report dated Aug. 17, 2017; European Patent Office; Munich Germany.

Braccini, Roberto; International Search Report dated May 31, 2017; International Application No. PCT/IB2017/051916; Netherlands.

Search Report dated Oct. 16, 2019; Japanese Application No. 2018-554484.

Written Opinion dated Feb. 5, 2020; Japanese Application No. 2018-554484.

Patino, Joseph et al.; Heat Coupled Polyswitch With Reverse Discharge Diode for Increased Safety Margin; Motorola, Inc.; Mar. 1998; pp. 132-134.

* cited by examiner

CIRCUIT ARRANGEMENT FOR PROTECTION AGAINST AN UNDUE OVERHEATING

FIELD OF THE INVENTION

The proposed invention concerns a circuit arrangement for protection against an undue overheating of a charging and/or discharging control and/or a secondary battery, which are in particular integrated into a household appliance such as an electric shaver, epilator, tooth brush, or more generally hair removal appliance or oral care appliance.

BACKGROUND OF THE INVENTION

The GB 2 349 284 A describes a circuit arrangement for preventing overcharge of lithium cells. Overcharging of a lithium ion cell is prevented by a heat-dissipating bypass component connected in parallel with the cell, the current bypass being negligible until the cell voltage rises above a threshold. The bypass is in good thermal contact with a thermally responsive resistor connected in series with the cell so that, when substantial current flows through the bypass, the temperature of the resistor is raised, so preventing significant further current flow through the cell.

However, it is a disadvantage that the current leading to a self-heating of the resistor has a fixed value. In normal state conditions, the amplitude of the current varies dependent on the respective condition of the device. Thus, it is not possible to adjust the proposed overcharge protection to different conditions of the circuit arrangement.

The US 2007/0025044 A1 describes a composite electrical circuit protection device, in which thermal coupling between a planar PPTC resistor element and a planar MOV element is controlled by insertion of a thermal mass material (13) for regulating heat transfer from the MOV element to the PPTC element, such that a PPTC resistor hot zone forms consistently away from the planar major foil electrode confronting the MOV thereby regulating heat transfer from the MOV to the PPTC resistor. In order to protect the load, the varistor (MOV) element shortcuts the electrical load in case of a major failure leading (normally, i.e. without providing the PPTC element) to very high temperatures in the varistor leading to a destruction of the varistor. By providing the proposed planar PPTC element mounted directly to the planar MOV element in good thermal coupling, the PPTC element can limit the current to the load and the MOV element immediately when the MOV element is heating up by the shortcut current. However, the electrical circuit protection device has a complicated structure due to the fact that it has several functions to be realized for protecting the load, namely (1) shortcutting the load in case of an overvoltage and/or overcurrent, (2) heating up the varistor (MOV) element in case of a shortcut, (3) transferring the heat to the PPTC resistor and (4) limiting the current from a power source to both, the load as well as the MOV element.

SUMMARY OF THE INVENTION

It is accordingly the object of the invention to propose a circuit arrangement for protecting against an undue overheating that is provided by a simple of the shelf electrical component and flexibly adapts to different state conditions of the circuit and of the device.

This object is solved with a circuit arrangement comprising a secondary battery, a charging and discharging control, a connector for connecting the charging and/or discharging control to an external power supply, at least one current limiting electronic component arranged in electrical connection to the charging and/or discharging control and optionally a switchable load. The load typical is formed by an electric motor for driving the household appliances, such as a brush of a toothbrush, a shear head of a shaver, an epilating drum of an epilator or the like. The charging and/or discharging control is proposed to be a dc-dc-converter, and current limiting electronic component is disposed in the connection between the connector for connecting the charging and/or discharging control to the external power supply and the charging and/or discharging control (3), wherein the current limiting electronic component is in line with the proposal a Polymeric Positive Temperature Coefficient component (PPTC component).

By using the PPTC component as current limiting electronic component arranged in the electrical connection to the charging and/or discharging control, current flowing to (and/or from) the charging and/or discharging control during charging (and/or discharging) of the secondary battery is flowing through said current limiting electronic component. The current flowing through said current limiting electronic component is limited with increasing temperature of the current limiting electronic component according to the PPTC characteristics. These PPTC characteristics ensure that an increasing temperature of the current limiting electronic component does not occur during normal working conditions. In case of a failure, increasing temperature of the current limiting electronic component originates (mainly) from thermal radiation of components of the circuit other than said current limiting electronic component itself, i.e. in particular from the charging and/or discharging control. This is valid for currents corresponding in amplitude to any normal state conditions of the circuit arrangement. For these currents, self-heating of the current limiting electronic component by a current having amplitude corresponding to at least any normal state of the circuit or device is negligible and does not lead to a limitation of current. This behavior is achieved by using PPTC components which have been found in line with the proposal to have these specific temperature characteristics.

This means that the PPTC current limiting electronic component is chosen and/or suited to conduct any normal state current without a temperature rise (of the current limiting electronic component) leading to the significant higher resistivity or lower conductivity. A suited threshold value not to be exceeded in this case might be a decrease in conductivity of 5% to 15% with respect to the conductivity in a normal ambient temperature state of the device (without current flowing through the current limiting electronic component at an ambient temperature of 20° C. or in the range of 15° C. to 25° C.).

In other words, the PPTC current limiting electronic component shows a resistance dependency of ambient temperature and current flowing through the component having a working area with an almost current and temperature independent resistance. In this working area, the resistance of the current limiting electronic component is almost constant, i.e. varies in a range of up to about 15%, preferably up to 10%. The working area is limited by a border function or curve limiting the maximum current flowing through the current limiting electronic component within the working area in dependence of the ambient temperature such that the maximum current decreases with rising ambient temperature until an ambient temperature threshold. If this ambient temperature threshold and/or the maximum current are exceeded, the current limiting electronic component is in a high resistance state. This high resistance state might have a gradient in the rise of resistance dependent on the amount of exceeding the ambient temperature threshold and/or the maximum current. After having reached by a high thermal impact, this high resistance state of the PPTC current limiting electronic component is upheld with even a lower thermal impact on the PPTC component and the complete PCB unit. This ensures high protection for the complete unit and the heat generating components in the circuit arrangement cool down.

For current amplitudes corresponding to a normal state condition of the circuit arrangement in the normal ambient temperature range of the device, the current limiting electronic component is in the working area as defined before. In this working area, the resistance of the current limiting electronic component remains constant (at least in the range defined before). Accordingly, for these normal currents and the normal ambient temperature, the resistance of the current limiting electronic component does not limit the functions of the device by limiting the current flowing through the current limiting device. However, if the current exceeds the maximum current allowed (current limit) given for the respective ambient temperature or if the ambient temperature at the location of current limiting component electronic component (due to an external heat impact onto the PPTC component) exceeds the ambient temperature threshold, the high resistance state limits and/or cuts off the current flowing through the current limiting electronic component thus performing a safety function.

In a preferred embodiment of the proposal, the charging and/or discharging control might be a charging control only for controlling the charging of the secondary battery. In this case, discharging of the secondary battery by a switchable load might be controlled elsewise.

Further, as the proposed current limiting electronic component is disposed in the connection between the connector for connecting the external power supply and the charging (and/or discharging) control, there might occur during charging from an external power supply situations in which a current is permanently supplied to the charging control even in case of a failure of electronic components of the charging control, i.e. the dc-dc-converter, leading to a significant heating of the charging control with even current amplitudes corresponding to a normal state condition of the circuit arrangement due to the permanent (quasi unlimited) power in the external power supply. The advantage of the proposed dc-dc-control as charging (and/or discharging) control is that the thermal losses of the dc-dc-control are very low compared the e.g. shunt regulators used as charging or discharging devices regularly according to the prior art.

Further current limiting protectors protecting against a failure in the circuitry, in which the secondary battery delivers the power of the circuitry might be chosen in line with the proposal as conventional current limiting elements, such a melting fuse. In this case it is sufficient according to one aspect of the proposal to protect the circuit arrangement against high currents. Overheating due to permanently supplied smaller currents might not occur in this case due to the limited capacity of the secondary battery. This means that in a practical application the secondary battery will be discharged before critical overheating occurs.

Further advantages aspects of the proposal are evident from the dependent claims.

DETAILED DESCRIPTION OF THE INVENTION

The proposal relates to any circuit arrangement for protection against an undue overheating of a charging and/or discharging control and/or a secondary battery. Typically, the circuit arrangement comprises at least a secondary battery, a charging and discharging control for controlling the charging and/or discharging of the secondary battery, a connector for connecting the charging and discharging control to an external power supply and optionally a switchable load. The circuit arrangement might be integrated into a household appliance such as an electric shaver, epilator, tooth brush, or more generally hair removal appliance or oral care appliance. In this case, the switchable load might be an electric motor. Of course, these appliances also comprise a Human Machine Interface HMI and an application control. The HMI might comprise at least one switch, optionally a display, and a microprocessor with the application control. In this microprocessor, also the charging and discharging control might be comprised.

In order to prevent the electric circuitry from damage caused by self-heating of defective electronic components in particular while charging (and/or discharging) the secondary battery, a current limiting electronic component is arranged in the electrical connection to the charging and/or discharging control such that the current flowing through said current limiting electronic component to the charging and/or discharging control is limited with increasing temperature of this electronic component. This is achieved by a resistance of the current limiting electronic component increasing with its temperature, wherein the major effect of the rise of the temperature is caused by thermal radiation of other components of the circuit, at least if the amplitude of the current is in a range of normal currents in normal functional states of the device and/or circuit. These currents are known and considered in the design of the current limiting electronic component being in line with the proposal a PPTC component as already described.

Before describing a preferred embodiment of the proposal in line with the invention, certain different aspects of the proposal are described. These aspects can be realized in an embodiment according to the invention independently from each other as will be acknowledged by the one skilled in the art.

For describing the current limiting aspect of the proposal in other words, the current limiting electronic component is disposed in the circuit arrangement from or to the charging and/or discharging control in a serial arrangement such that a charging (and/or discharging) current is flowing through the current limiting electronic component. As long as current flowing through the current limiting electronic component corresponds to a normal state condition of the circuit arrangement, self-heating of the current limiting electronic component and the further components of the circuit arrangement (in particular the dc-dc-converter used as charging control have very low thermal losses during normal working conditions) does not lead to a notable limitation of the current flowing through the current limiting electronic component. Only if the current exceeds in amplitude a current flowing through the current limiting electronic component during any normal operation of the circuit arrangement (i.e. in other words: corresponding to no normal condition), self-heating of the current limiting electronic component and/or other components of the circuit arrangement limits the allowed current through the current limiting component.

Normal state conditions of the circuit arrangement during charging (and/or discharging) of the battery typically comprise different currents, i.e. currents with different amplitudes. Thus, the same value of current flowing through the current limiting electronic component in one (normal) state condition might lead to an overheating of some electronic components in another (not normal) state condition. Accordingly, the value of the amplitude of such current flowing through the current limiting electronic component must not lead to a limitation of current in order to secure safe operation in the normal conditions.

In addition, heating of the current limiting electronic component by thermal radiation from other—in particular—electric or electronic components, such as the charging and/or discharging control, the secondary battery, a logical component, e.g. a processor, leads in line with the proposal to a limitation of the current flowing through the current limiting electronic component.

This can preferably be achieved by that the current limiting electronic component is a PPTC electronic module. PPTC elements have a temperature dependent resistance that does not limit the current flowing through the current limiting electronic component in a temperature range below a defined threshold temperature of the electronic component wherein the current flowing through the component during all normal state conditions of circuit arrangement does not lead to a self-heating of the electronic component above the defined threshold temperature.

However, the protection against overheating also works in this case because any rise of temperature in the circuit arrangement leads due to thermal radiation to a heating of the current limiting electronic component. As a consequence, if the temperature exceeds the given temperature limit, the current flowing through the current limiting electronic component is limited, even if the same amplitude of current is a regular current in another (normal) state condition of the circuit arrangement. This is due to the fact that the increasing temperature of the current limiting electronic component originates from thermal radiation of components of the circuit other than said current limiting electronic component and might, for example, not be caused by the current flowing through this current limiting electronic component itself. This might be true for any amplitude of the current corresponding to an amplitude of the current in at least one normal state condition of the circuit and/or the device.

In order to directly relate the protection of the current limiting electronic component to the relevant components in the circuit arrangement, at least one of optionally several current limiting electronic components might be disposed in spatial vicinity, i.e. adjacent to the charging and/or discharging control. The charging and discharging control is a dc-dc-controller and might comprise e.g. also a microcontroller. Overheating of said charging and discharging control indicates typically a severe error that justifies a limitation of the function of the circuit arrangement by reducing the allowed current flowing through the current limiting electronic device as a safety measure.

As the proposed current limiting electronic component is disposed in the connection (electronical connection line) between the connector for connecting the charging and/or discharging control to the external power supply and the charging and/or discharging control itself, this is an effective protection against any kind of overheating of the charging and/or discharging control causing form high currents and/or currents permanently applied by the external power supply. In a preferred option according to this embodiment, a further current limiting protector disposed in spatial vicinity, i.e. adjacent to the secondary battery might be of a melting fuse type. This is an effective protection against high currents. Overheating with permanently applied small currents might in this case be less important due to the limited capacity of the secondary battery. In other words, the secondary battery might be discharged before any overheating due to small currents supplied from the secondary battery occurs.

As suited current limiting electronic component in line with the proposal a Polymeric Positive Temperature Coefficient (PPTC) component is proposed. Such PPTC-components are commercially available with different temperature dependent resistances and/or different allowed currents not leading to self-heating of the PPTC-components itself. These components are available of the shelf and can be used as the proposed current limiting electronic component as commercially available, i.e. with e.g. combining the PPTC structure with another protective components, such a varistor or MOV. This is an important aspect of the proposal as the production costs are reduced. Thus, the one skilled in the art can choose PPTC-components in a suited dimension and/or configuration for the design of the circuit arrangement. Further, these PPTC components can simply be mounted in a SMD-technique on generic circuit boards.

Additionally (or in an alternative embodiment of the proposal) it might be provided at least one further of optionally several current limiting electronic components is disposed in spatial vicinity, i.e. adjacent to the secondary battery. Thus, overheating of the battery directly causes heating of the current limiting electronic device leading to an increased resistance of the current limiting electronic device even if the current flowing through the current limiting electronic device still corresponds to an amplitude that might occur during regular use and will not lead to self-heating of the current limiting electronic component.

Another aspect of the proposed current limiting electronic component is that the limitation of the function of the device is limited to situations in which the actual temperature in the circuit arrangement is too high, i.e. exceeding a defined temperature limit. When the temperature in the circuit arrangement is cooling down, the limitation of the current is not applied any more, and the device is resuming regular operation. Thus, with the proposed current limiting electronic component being a PPTC component, no further logic of the protection circuitry is required, e.g. for performing a reset or testing the amplitude of the current dependent on a specific state condition of the circuit arrangement and/or the device. Additionally, the proposed current limiting electronic component might protect against current exceeding a (preferably ambient temperature dependent) maximum current.

According to another, also independent, aspect of the proposal, a heat conduction body can be disposed between the respective current limiting electronic component and the secondary battery and/or the charging and discharging control. This enhances the thermal conduction between the relevant elements of the circuit arrangement. However, the heat conduction body might also be disposed between the current limiting electronic component and other components of the circuit arrangement which might be overheated and lead an overheating of the secondary battery. One surface of the conduction body might be in contact with said respective current limiting electronic component. Thus, the heat of other components is transported directly to the current limiting electronic component, i.e. the proposed safety component. In similar manner, one surface of the heat conduction body might be in contact with a surface of the secondary battery and/or the charging and discharging control in order to directly transport the heat created by these components to the safety component, i.e. the current limiting electronic component current limiting electronic component. In order to achieve high thermal conductivity between the current limiting electronic component and other elements or components of the circuit arrangement, the surfaces of the heat conduction body might be in contact with both, the current limiting electronic component and the other components.

Mounting the current limiting electronic component to the circuit arrangement in a SMD-technique is a preferred technique for the connection of the current limiting electronic component to the circuitry on the circuit board. The SMD technique relates to Surface Mounted Devices that can be mounted on the surface of a circuit board using common automatic assembly techniques, such as soldering. Thus, mounting a PPTC component to the circuit board requires small mounting space and allows to position the PPTC component (or another current limiting electronic component) at almost any desired position to receive the thermal radiation of other electric or electronic components.

Figure 1:
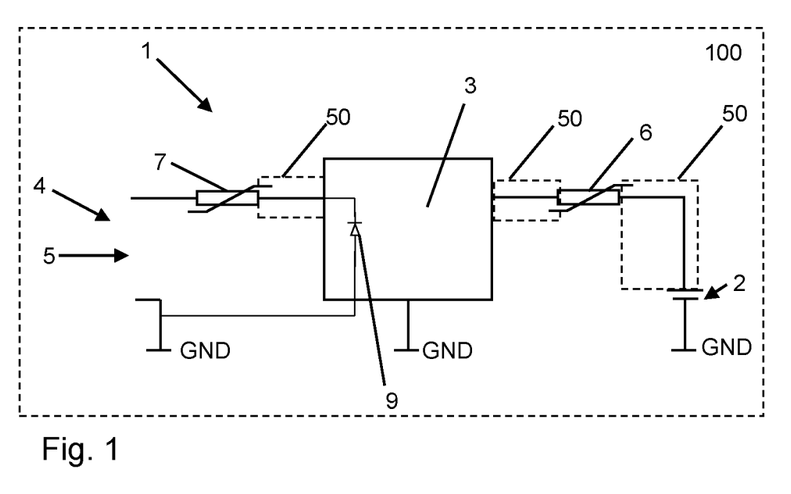
FIG. 1 shows an embodiment of a circuit arrangement for protection against an undue overheating of the secondary battery according to one preferred embodiment of the invention.

FIG. 1 shows schematically a circuit arrangement 1 for protection against an undue overheating of the circuit arrangement according to an embodiment of the proposal. The circuit arrangement 1 might be part of a larger circuitry of a device, such as a household appliance 100 as already described. The circuit arrangement 1 comprises besides the secondary battery 2 a charging and/or discharging control 3 (in the following: charging and discharging control 3 with the meaning that it can be a charging control, a combined charging and discharging control or a discharging control) connected to one pole of the secondary battery 2, in the example shown the plus-pole. The other pole of the secondary battery 2, in the example the minus-pole, is connected to ground GND. The charging (and/or discharging) control 3 is or at least comprises a dc-dc-converter.

The charging and discharging control 3 controls the charging (and/or discharging) of the secondary battery 2. For the charging, the control 3 is disposed in electrical connection between a connector 4 for connecting an external power source 5 indicated by an arrow in the figures to the control 3. In case of charging, the charging (and/or discharging) control 3 controls a current flowing from the external power source 5 connected to the connector 4 through the control 3 into the secondary battery 2.

The charging (and/or discharging) control 3 is a dc-dc-converter and might comprise a microcontroller with a charging and/or discharging control application installed thereon, and power switches such as MOSFET-transistors, switchable by the microprocessor for switching off and on the current to the secondary battery 2 (in particular the charging current) and/or from the secondary battery 2 (in particular for driving a load not shown in the figures). However, in line with the proposal, the charging (and/or discharging) control 3 might by any type of a dc-dc-converter allow charging of the secondary battery 2 with low thermal losses in a normal working state. Thus, the proposed combination of a dc-dc-converter as charging (and/or discharging) control 3 and a PPTC current limiting electronic component can make synergistic use of the electric characteristics of both components.

The electronic components of the control 3 are adapted such that the required charging power is loaded into the secondary battery 2 during charging. Optionally, a discharging power drawn from the secondary battery 2 might be much higher than the charging power, leading to discharging currents higher than charging current. However, due to the limited capacity of the secondary battery, the energy deliverable by the secondary battery is limited.

Possible errors leading to not allowed overheating of the components and in particular of the charging and discharging control 3 and/or of secondary battery 2, might occur in any of the electric or electronic components disposed between the external power source 5 and the secondary battery 2. These components might draw power from the external source 5 and/or the secondary battery 2 leading to a self-heating of these components. Also the secondary battery 2 might heat up in a not allowed manner, e.g. if the charging current is too high. However, this too high charging current might in amplitude still be lower than a normal discharging current in a regular or normal state condition of the device.

This leads to a difficulty in the error handling. The nominal values and the error values of the power (and in particular the corresponding current to and/or from the battery) are too similar, and in certain cases of normal state condition of the device and/or the circuit arrangement even equal or overlapping. Thus, normal overheat protection elements configured to provide protection dependent on the current (or power) flowing through these overheat protection elements do not work in this case. Further, known overheat protection elements for these cases are not suited for a SMD-technique and/or require an elaborated control itself. The use of such components is thus expensive.

In line with the proposal, at least the current limiting electronic component 7 is proposed to be an of-the-shelf PPTC component that is cheap and can be mounted on a circuit board in a SMD-technique. Such PPTC components work as an overcurrent protection and generally work with the principle of a defined self-heating when a certain current threshold is exceeded as already described in detail.

However, according to the proposal, the certain current threshold is defined such that all normal currents (i.e. amplitudes of currents occurring in a normal state condition of the device or circuit arrangement) are allowed without any limitation of the current limiting electronic component 6, 7. This limitation is also called de-rating, as the behavior of the element is limited or de-rated. As mentioned before, such a configuration does not lead to a safe overheat protection as power states or currents are allowed that might lead to an overheating of the secondary battery 2. This overheating of the secondary battery 2 might be caused by self-heating of the secondary battery 2 and/or heating up of the secondary battery 2 by thermal radiation emitted from components comprised in the circuit, and in particular the charging and discharging control 3.

Accordingly, the concept of the proposal is that at least the current limiting electronic component 7 is arranged in the electrical connection to the charging (and/or discharging) control 3 such that at least the charging current flowing from the external power source 5 to the secondary battery 2 during charging is flowing through said at least one current limiting electronic component 7. The current flowing through said current limiting electronic component 7 is limited with increasing temperature of the current limiting electronic component 7, wherein the increasing temperature of the current limiting electronic component 7 originates mainly from thermal radiation of components of the circuit arrangement 1 other than said current limiting electronic component 7 or from an overcurrent higher in amplitude than other normal currents corresponding to normal state conditions of the circuit arrangement 1 and/or the device.

Figure 2:
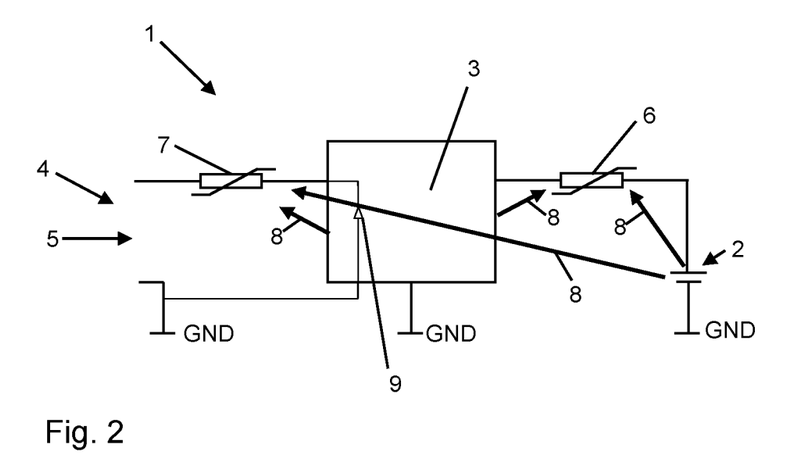
FIG. 2 shows the influence of thermal radiation emitted form electric or electronic components of the circuit arrangement according to FIG. 1.

This is shown for the embodiment in FIGS. 1 and 2 with a first current limiting electronic component 7 and an optional second current limiting electronic component 6. Both current limiting electronic components 6, 7 might according to an example be PPTC-components that are cheap and can be SMD-mounted. However, as already mentioned, another preferred embodiment according to the proposal provides a PPTC-element as current limiting electronic component 7 and a melting fuse as current limiting electronic component 6, also designated current limiting protector for the secondary battery 2 (instead of the current limiting electronic component 6 being also a PPTC-component). In particular the second current limiting electronic component 6 might be a melting fuse (used as ordinary current limiting protector) because the circuit arrangement 1 has mainly to be protected against high amplitude currents from the secondary battery 2. Due to the limited capacity of the secondary battery 2. Lower or medium amplitude currents (corresponding to "normal" currents in the device) will not lead to severe damages in the circuit due to the limited capacity of the secondary battery 2 and thus the limited time these currents can be delivered by the secondary battery 2.

Accordingly, the first current limiting electronic component 7 is provided and disposed in the connection between the charging and discharging control 3 and the connector 4, preferably next to or adjacent to the charging (and/or discharging) control 3. This current limiting electronic component 7 receives thermal radiation 8 from at least the charging (and/or discharging) control 3 in case of any overheating of the control 3. Such overheating might normally occur only if current (in particular a charging current) is supplied to the device from the external power source 5. Of course, also thermal radiation of the secondary battery 2 irradiates onto this first current limiting electronic component 7. Same applies to possible other electronic components in the circuit.

Additionally, there might be provided a further overheat protection close to the secondary battery 2. According to one proposal, a further or second current limiting electronic component 6 is disposed in the connection between the charging (and/or discharging) control 3 and the secondary battery 2. More generally, an arrangement of the second current limiting electronic component 6 is chosen in which the second current limiting electronic component 6 is disposed in direct vicinity, i.e. next or adjacent to the secondary battery 2, and preferably also next to or adjacent to the charging (and/or discharging) control 3. Thus, a preferred disposal of the second current limiting electronic component 6 is between the secondary battery 2 and the control 3. Thus, any self-heating of the secondary battery 2 and/or the control 3 leads to thermal radiation 8 (shown in FIG. 2) irradiating on the first current limiting electronic component 6. This thermal radiation 8 (indicated as arrows in FIG. 2) heats up the further current limiting electronic component 6 leading to an increasing resistance and thus a limitation of the current flowing to the secondary battery 2.

However, in line with the an embodiment of the proposal, the first and second current limiting electronic components 6, 7 are disposed next to the secondary battery 2 and the control 3 in a sense that heating up of the control 3 and/or the secondary battery might have an impact on the first and/or second current limiting electronic components 6, 7. Such disposal of the first and second current limiting electronic components 6, 7 limits the overheat protection mainly to the components in spatial vicinity of the secondary battery 2 and the charging and discharging control 3. The first and second current limiting electronic components 6, 7, and at least the PPTC current limiting electronic component 7, do preferably not actuate their protecting function based on a self-heating, but based on thermal radiation 8 irradiating on the current limiting components 6 and/or 7 form other components. Only if the amplitude of a current is exceeding the threshold higher than any normal current amplitude of the device, self-heating of the first and/or second current limiting component 6, 7 occurs.

As already described in detail, the second current limiting electronic component 6 might be substituted by an ordinary overheat protection (such as a melting fuse) without departing from the proposal.

In line with the proposal, a local overheat protection is realized based on the actual temperatures of the surrounding components, irrespective of the actual current or power state of the circuitry. By limiting the current in any case of overheating, the temperature within the overall circuitry is limited and the circuit arrangement 1 is protected against overheating.

This concept might also be used for other electronic components to be protected against overheating in an easy and effective manner, irrespective of the reason for a local (or even global) heating up of the circuitry.

Provision of two or more current limiting electronic components might lead to a redundancy of the overheating protection. Also, the disposal of heat conduction elements 50 between the current limiting electronic components 6, 7 and the surveyed and protected components, such as the secondary battery 2 and the control 3, might improve the efficiency of the proposed technology.

The proposal is a cost efficient way to realize a decentralized overheat protection. A further advantage is that the device returns to normal function when the components are cooled down, without any need for a controlled reset.

Figure 3:
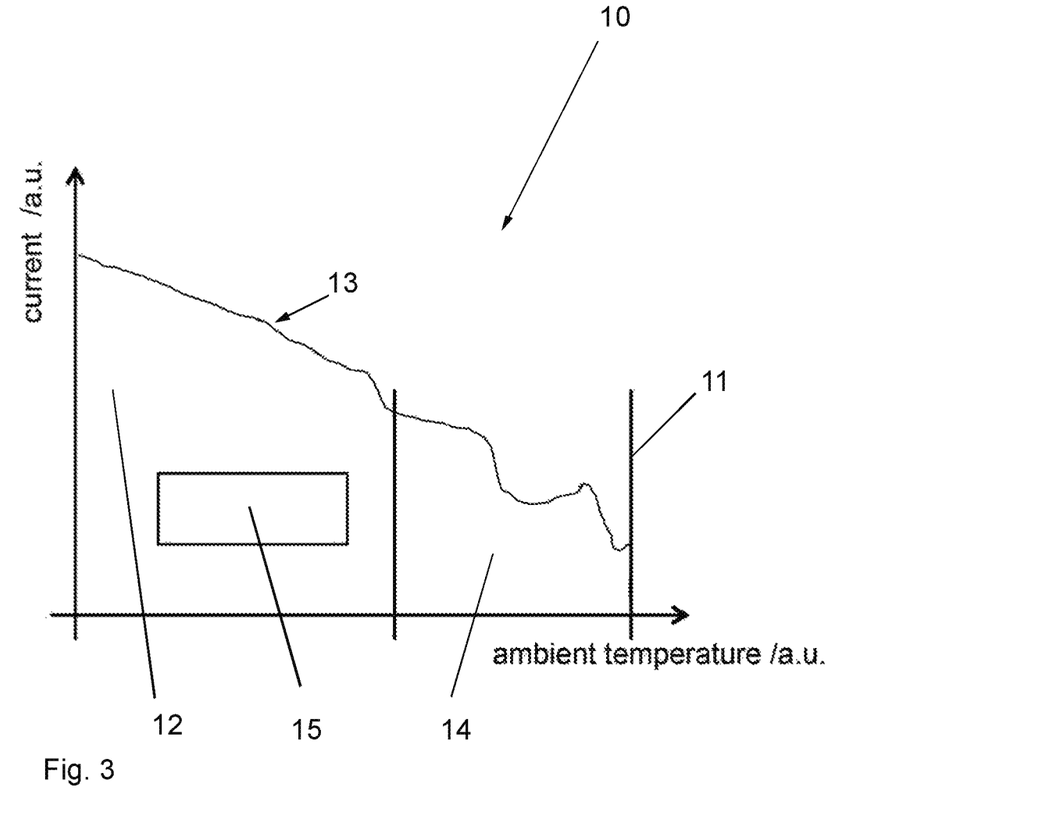
FIG. 3 shows a resistance map of a typical PPTC-component as an example for a current limiting electronic component, the graph displaying the current through the component dependent on the ambient temperature in arbitrary units.

FIG. 3 shows a resistance map 10 of the proposed PPTC current limiting electronic component 7 with the behavior as described in line with the proposal. The ambient temperature ranges from about 0° C. to an ambient temperature threshold 11, e.g. about 120° C.

Below this ambient temperature threshold 11, the current limiting electronic component 7 might work in a working area 15 comprised in the low temperature zone 12 as long as the current flowing through the current limiting electronic component is below a maximum current curve 13. In the working area 15, there might be a linear dependence between the maximum current curve 13 and the ambient temperature. Between the low temperature zone 12 (comprising the working area 15) and the ambient temperature threshold 11, there might be provided a transition zone 14 with a more random dependence between the maximum current curve 13 and the ambient temperature.

At least in the working area 15, the resistance of the PPTC current limiting electronic component 7 is essentially constant, i.e. constant within a variation range of e.g. up to 10% or 15%.

The current limiting electronic component 7 is chosen such that the normal state conditions of the circuit arrangement is positioned within the working area 15 (operating area) comprised in the low temperature zone 12. For typical proposed devices, the normal state conditions might range for the current from about 400 mA to about 1000 mA and for the ambient temperature between 5° C. and 50° C. The transition zone 14 might start at about 90° C.

In case of overheating of components in the circuit arrangement, the ambient temperature might rise. At least after trespassing the ambient temperature threshold 11, the current limiting electronic component passes over in the high resistance mode lying in FIG. 3 above the maximum current curve 13 (being zero or close to zero at the ambient temperature threshold). In this region above the maximum current curve 13, the current flow is limited or even stopped by the rise of the PPTC component resistance thus realizing to the desired safety function.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A circuit arrangement for protection against an undue overheating of a charging and/or discharging control and/or of a secondary battery, the circuit arrangement comprising:
   the secondary battery,
   the charging and/or discharging control for charging and/or discharging the secondary battery,
   a connector for connecting the charging and/or discharging control to an external power supply, and
   at least one current limiting electronic component arranged in electrical connection to the charging and/or discharging control,
   said charging and/or discharging control is a dc-dc-converter,
   said current limiting electronic component is disposed in the connection between the connector for connecting the charging and/or discharging control to the external power supply and the charging and/or discharging control so as to control a flow of current from the external power supply to the charging and/or discharging control, and
   said current limiting electronic component is a Polymeric Positive Temperature Coefficient component.

2. The circuit arrangement according to claim 1, wherein the current limiting electronic component is an electronic module with a temperature dependent resistance that does not limit the current flowing through the current limiting electronic component in a temperature range below a defined threshold temperature of the electronic module, wherein the current flowing through the current limiting electronic component during all normal state conditions of circuit arrangement does not lead to a self-heating of the current limiting electronic component above the defined threshold temperature.

3. The circuit arrangement according to claim 1, wherein the current limiting electronic component is disposed adjacent to the charging and/or discharging control.

4. The circuit arrangement according to claim 1, wherein the current limiting electronic component is a standard off the shelf electronic component.

5. The circuit arrangement according to claim 1, wherein a heat conduction body is disposed between the current limiting electronic component and the charging and/or discharging control.

6. The circuit arrangement according to claim 5, wherein one surface of the heat conduction body is in contact with the charging and/or discharging control.

7. The circuit arrangement according to claim 1, wherein at least one further current limiting electronic component is disposed adjacent to the secondary battery in electrical connection with a positive terminal of the secondary battery.

8. The circuit arrangement according to claim 7, wherein a heat conduction body is disposed between the further current limiting electronic component and the secondary battery.

9. A circuit arrangement for protection against an undue overheating of a charging and/or discharging control and/or of a secondary battery, the circuit arrangement comprising:
   the secondary battery,
   the charging and/or discharging control for charging and/or discharging the secondary battery,
   a connector for connecting the charging and/or discharging control to an external power supply,
   at least one first current limiting electronic component arranged in electrical connection to the charging and/or discharging control, and
   at least one further current limiting electronic component disposed adjacent to the secondary battery,
   the further current limiting electronic component in electrical communication with a positive terminal of the secondary battery,
   said charging and/or discharging control is a dc-dc-converter,
   said first current limiting electronic component is disposed in the connection between the connector for connecting the charging and/or discharging control to the external power supply and the charging and/or discharging control,
   said first current limiting electronic component is a Polymeric Positive Temperature Coefficient component, and
   a heat conduction body is disposed between the further current limiting electronic component and the secondary battery, wherein one surface of the heat conduction body is in contact with the secondary battery.

10. The circuit arrangement according to claim 5, wherein one surface of the heat conduction body is in contact with said current limiting electronic component.

11. The circuit arrangement according to claim 7, wherein the further current limiting electronic component disposed adjacent to the secondary battery is of a melting fuse type.

12. The circuit arrangement according to claim 1, wherein the charging and/or discharging control comprises a diode connected between the two poles of the connector for connection to the external power supply for protecting against reverse poling of the external power supply.

13. A circuit arrangement for protection against an undue overheating of a charging and/or discharging control and/or of a secondary battery, the circuit arrangement comprising:
the secondary battery,
the charging and/or discharging control for charging and/or discharging the secondary battery,
a connector for connecting the charging and/or discharging control to an external power supply, and
at least one current limiting electronic component arranged in electrical connection to the charging and/or discharging control,
said charging and/or discharging control is a dc-dc-converter,
said current limiting electronic component is disposed in the connection between the connector for connecting the charging and/or discharging control to the external power supply and the charging and/or discharging control so as to control a flow of current from the external power supply to the charging and/or discharging control,
said current limiting electronic component is a Polymeric Positive Temperature Coefficient component, and
wherein the circuit arrangement is integrated into a household appliance.

14. The circuit arrangement of claim 9, wherein said first current limiting electronic component disposed in the connection between the connector for connecting the charging and/or discharging control to the external power supply and the charging and/or discharging control controls a flow of current from the external power supply to the charging and/or discharging control.

15. The circuit arrangement according to claim 13, wherein the current limiting electronic component is an electronic module with a temperature dependent resistance that does not limit the current flowing through the current limiting electronic component in a temperature range below a defined threshold temperature of the electronic module, wherein the current flowing through the current limiting electronic component during all normal state conditions of circuit arrangement does not lead to a self-heating of the current limiting electronic component above the defined threshold temperature.

16. The circuit arrangement according to claim 13, wherein the current limiting electronic component is disposed adjacent to the charging and/or discharging control.

17. The circuit arrangement according to claim 13, wherein the current limiting electronic component is a standard off the shelf electronic component.

18. The circuit arrangement according to claim 13, wherein a heat conduction body is disposed between the current limiting electronic component and the charging and/or discharging control.

19. The circuit arrangement according to claim 13, wherein at least one further current limiting electronic component is disposed adjacent to the secondary battery in electrical connection with a positive terminal of the secondary battery.

20. The circuit arrangement according to claim 13, wherein the charging and/or discharging control comprises a diode connected between the two poles of the connector for connection to the external power supply for protecting against reverse poling of the external power supply.

* * * * *